United States Patent [19]
Bilow et al.

[11] 3,879,349
[45] Apr. 22, 1975

[54] HOMOPOLYMERIZATION OF ACETYLENE SUBSTITUTED POLYIMIDE POLYMERS

[75] Inventors: Norman Bilow, Los Angeles; Abraham L. Landis, Northridge, both of Calif.

[73] Assignee: Hughes Aircraft Company, Culver City, Calif.

[22] Filed: Nov. 12, 1973

[21] Appl. No.: 415,083

[52] U.S. Cl. ...... 260/47 UA; 117/124 E; 117/161 P; 161/197; 161/227; 260/30.2; 260/30.8 R; 260/30.8 DS; 260/32.6 N; 260/37 N; 260/47 CZ; 260/47 CP; 260/49; 260/50; 260/78 UA; 260/78 TF
[51] Int. Cl. ............................................ C08g 20/32
[58] Field of Search .. 260/47 UA;47 CP, 65, 78 TF, 260/78 UA, 49, 63 N, 47 CZ

[56] References Cited
UNITED STATES PATENTS
3,516,967  6/1970  Funer .................................. 260/47
3,526,610  9/1970  Bower ................................. 260/75

*Primary Examiner*—Lester L. Lee
*Attorney, Agent, or Firm*—W. H. MacAllister; B. T. Hogan, Jr.

[57] ABSTRACT

Polyimides are prepared from acetylene substituted polyimide oligomers via an addition polymerization reaction which involves homopolymerization. These polymers exhibit low void content when cured and possess superior thermal stability characteristics and physical properties such as structural strength. One of their unique properties is their ability to be processed into useful articles at moderate pressures and temperatures.

4 Claims, No Drawings

HOMOPOLYMERIZATION OF ACETYLENE SUBSTITUTED POLYIMIDE POLYMERS

The invention herein described was made in the course of or under contract or subcontract with the U.S. Air Force.

CROSS-REFERENCE TO RELATED APPLICATIONS

This invention discloses a novel method of forming cured polymers from the oligomers disclosed in application Ser. No. 347,501, filed on Apr. 3, 1973, now abandoned.

BACKGROUND OF THE INVENTION

1. Field of the Invention

Our invention deals with high molecular weight, high strength polymers from acetylene substituted polyimide oligomers and methods for forming such polymers.

2. Description of the Prior Art

The best known polyimide art deals with the production of high temperature polyimide polymers from polyamic acids by condensation polymerization reactions. Such reactions liberate volatile byproducts such as water during cure and consequently produce void-filled fabricated structures when the prepolymers are used to produce such items as laminates. Examples of this art are the products formed from polyamic acids and other comonomers.

The known art also describes addition copolymers of cyclopentadiene and bis maleimides. These materials cure through addition, but they tend to liberate flammable cyclopentadiene when heated above 550°F which results in a degradation process.

We have disclosed, in application Ser. No. 416,483 filed on Nov. 16, 1973, in the names of Norman Bilow, Abraham L. Landis and Leroy J. Miller as inventors, copolymers of terephthalonitrile N,N'-dioxide and acetylene substituted polyimide oligomers which solve many of the problems associated with the production of voids during cure and postcure of polyimide polymers at high temperatures. Voids are undesirable because they tend to detract from the physical properties and thermal oxidative stability characteristics of these polymers. Our present invention is a significant improvement over that process. The ability to form useful polymeric materials by homopolymerization eliminates the need for critical prepolymer formulation requirements, and the cured end products exhibit superior thermal as well as physical property characteristics.

There have been prior art disclosures which teach that bis maleimides can be homopolymerized but the cured products are brittle. Bis maleimides can also be copolymerized with amines to give useful addition type copolymers. One example is the commercial Kerimid 601 polyimide manufactured by Rhodia, Inc., New York a subsidiary of Rhone Poulenc. The Kerimide polyimides are reported to exhibit flexural strength up to approximately 60,000 psi and are stable up to approximately 480°F. The manufacturer does not recommend the use above 500°F. Our homopolymerized polyimides can exhibit flexural strengths of over 1 million psi in 181 E glass fabric reinforced laminates and over 250,000 psi in unidirectional graphite reinforced laminates. The resins have been shown to be thermally stable for extended periods (1,000 hrs.) above 550°F in air or 500 hrs. at 600°F.

SUMMARY OF THE INVENTION

We have discovered that acetylene-terminated polyimide oligomers, having the structure

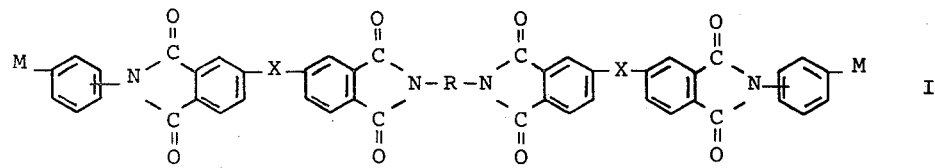

where M is —C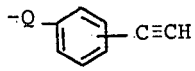CH or

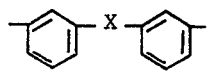

and wherein Q is O, $CH_2$, $SO_2$, $-CF_2-_n$, CO, or S where
 $X = CO$, O, $CH_2$, $SO_2$ or $-CF_2-_n$ and
 $R = C_6H_4-Y-C_6H_4-$, $-C_6H_4-Y-C_6H_4-Y-C_6H_4-$, or $-C_6H_4-Y-C_6H_4-Y-C_6H_4-Y-C_6H_4-$ where $Y = CO$, O, $CH_2$, $SO_2$, or $CF_2$ or any combination thereof if more than one Y is present, and where

can be replaced by

or and where the R group may bear one or more groups selected from the group chlorine, methyl, phenyl or ethynyl, can be homopolymerized to form polymers which exhibit substantially superior thermal stability, oxidative stability and high temperature flexural strength. The reaction will proceed with or without the addition of a catalyst; however, without a catalyst temperatures of about 350°–500°F are generally required. The cured polymers (resins) cured under these conditions are essentially void free especially if they are molded under moderate pressure such as 100–300 psi.

These polymers have substantial advantages in the preparation of laminates and filled molded compositions. Because of their high structural strength, they would be excellent for fabricating spacecraft antennas, jet vanes and various aircraft structural members.

DESCRIPTION OF THE INVENTION

In practicing our invention, we utilize acetylene-terminated polyimide oligomers of structure I. The oligomers can be dissolved in a solvent such as N-methylpyrrolidene, sulfane, dimethyl sulfone and dimethlformamiide to produce a varnish suitable for coating a reinforcement such as glass-, carbon-, or graphite-fabric. Cutouts from these fabrics can be stacked and molded under pressure using a hydraulic press, autoclave, vacuum bag, or heavy weight. The required pressures are frequently less than 200 psi. It also is possible to add filler materials to the resins before molding to achieve specific properties. Typical fillers which could be used include but are not limited to clays, talc, alumina, silica sand, glass-, graphite-, or phenolic-microballons, minerals and chopped fabrics.

The oligomers cure without catalysts in the range of 350°–500°F although we currently prefer the 385°–425°F range. Lower temperature cures are feasible, but catalysts may be required to achieve useful polymerization rates. Catalysts which may be useful include the Ziegler type catalysts such as trialkylaluminum-titanium tetrachloride mixtures, Friedel Crafts catalysts, metal carbonyls, tetraphenyl tin, zinc and tin octanoates. These agents have been used in the past to promote acetylenic trimerizations and may be useful to promote polymerizations such as ours.

Polymerization may be visualized as proceeding according to the general reaction scheme shown in plate II wherein R is

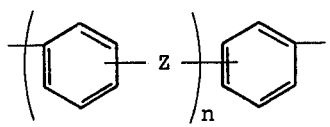

wherein Z is O, $CH_2$, S, CO, $SO_2$, $-CF_2-_m$, $-CF_2-O-CF_2-$
wherein $n$ is 0–5
wherein $m$ is 0–5
wherein R' is O, S, $CH_2$, $SO_2$, $-CF_2-_m$, $-CF_2-O-CF_2-$
wherein X is O, $CH_2$, S, CO, $SO_2$, $-CF_2-_m$, $-CF_2-O-CF_2-$
wherein $n'$ is 0 to 5
wherein $n''$ is 0 to 5

Specific illustrations of methods of practicing our invention are presented in the following examples:

EXAMPLE 1

Preparation of Oligomer 1

To a solution of benzophenonetetracarboxylic dianhydride (55.1 grams, 0.171 mole) in dry dimethylformamide (215 ml) heated at reflux, a solution of 1,3-di(3-aminophenoxy)benzene (24.95 grams, 0.0855 mole) in dry dimethylformamide (215 ml) was added dropwise over a 30-minute period. The reaction mixture was stirred at reflux for 2 hours and then a solution of 3-aminophenylacetylene (20.0 grams, 0.171 mole) in dimethylformamide (100 ml) was added over a 15-minute period and the solution heated at reflux for an additional hour after the addition. The solvent was removed with the rotary evaporator and to the residue were added m-cresol (250 ml) and benzene (100 ml). The mixture was heated to total reflux using a Dean-Stark water trap. After 18 hours, a total of 3.2 ml of water was present in the trap. The benzene/m-cresol mix was removed with the rotary evaporator. The residue was extracted with several liters of benzene and the extract washed with dilute aqueous sodium hydroxide and water. Upon removal of the benzene with the rotary evaporator, a gummy solid (10 grams) was obtained. The benzene-insoluble portion (70 grams) was dried in vacuum at 80°C. The product softened at 190°C and upon heating at 250°C in air cured into a tough transparent amber solid.

Laminate from Oligomer of Example 1

This resin was applied to 181E glass cloth fabric (with an A–1100 finish) using a hot dip method to maintain the resin in solution. Thus, the resin was dissolved in hot dimethylformamide, placed in a dip tank and coating was continued until most of the varnish was gone.

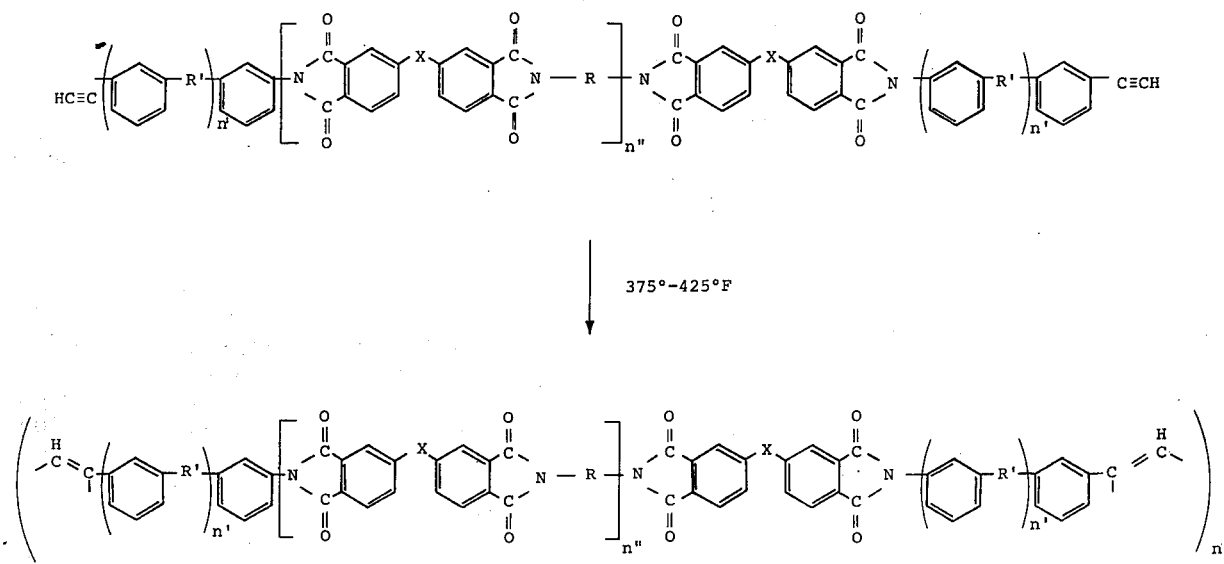

The impregnated cloth was vacuum-dried at 272°F for 16 hours and the fabric appeared to be evenly coated. A seven-ply laminate was molded at 535°F and 200 psi for 4 hours. No outgassing was observed during the molding. The laminate had an excellent appearance. It was then postcured in air using the following cyle: 4 hours at each temperature, 450°F, 500°F, 550°F and 600°F. During the post-cure, the laminate lost 0.31 percent in weight to yield a final void content of 1.27 percent.

EXAMPLE 2

Preparation of Oligomer 2

To a solution of benzophenonetetracarboxylic dianhydride (82.3 grams, 0.256 mole) in dry dimethylformamide (325 ml) heated at reflux, a solution of 1,3-di(3-aminophenoxy)benzene (37.4 grams, 0.128 mole) was added dropwise over a 1 hour period. The mixture was heated at reflux for 1½ hour and then a solution of 3-aminophenylacetylene (30.0 grams, 0.256 mole) in dimethylformamide (150 ml) was added and the solution heated at reflux for an additional 1½ hours after the addition. The solvent was removed on the rotary evaporator and to the residue were added m-cresol (350 ml) and benzene (150 ml). The mixture was heated at total reflux with a Dean-Stark water trap. After several hours, 1.5 ml of water along with 50 ml of benzene were removed from the trap. The mixture was heated at total reflux overnight during which time an additional 3.5 ml of water was collected. The benzene/m-cresol mixture was removed on the rotary evaporator. The residue was throughly washed with absolute ethanol and dried in a vacuum oven overnight at 80°C. The dried product weighed 134.3 grams.

Laminate from Oligomer 2

A lacquer of oligomer 2 in dimethylformamide, having a solids content of 18 percent, was used to impregnate 181E glass cloth with an A–1100 finish. The impregnated cloth was dried in a circulating air oven at 325°F for 15 minutes and then vacuum dried at 250°F for 4 hours. A seven-ply laminate was molded at 525°F, 200 psi, 2 hours, using a contact time of 90 seconds prior to molding. The resulting laminate had a resin content of 32.8 percent. It was then post-cured in air using the following cycle: 4 hours at each temperature, 450°F, 500°F, 550°F and 600°F. There were several small blisters present on the surface. Specimens were cut from the areas which did not show any blistering. The void content of this laminate was 3.5 percent.

EXAMPLE 3

Preparation of Oligomer 3

To a solution of benzophenonetetracarboxylic dianhydride (85.0 grams, 0.246 mole) in dry dimethylformamide (325 ml) heated at reflux, a solution of 1,3-di(3-aminophenoxy)benzene 38.5 grams, 0.132 mole) in dimethylformamide (3245ml) was added dropwise over a 2 hour period. The mixture was heated at reflux for 60 minutes and then a solution of 3-aminophenylacetylene (31.4 grams, 0.264 mole) in dimethylformamide (150 ml) was added. The mixture was heated at reflux for 30 minutes. The solvent was removed on the rotary evaporator and to the residue were added m-cresol (350 ml) and benzene (150 ml). The mixture was heated at total reflux with a Dean-Stark water trap over a weekend during which time 4.8 ml of water was trapped. The benzene/m-cresol mixture was removed with the rotary evaporator. The residue was thoroughly washed with absolute ethanol and dried in a vacuum oven for 24 hours at 80°C. The dried product weighed 136.8 grams.

Laminate from Oligomer 3

A lacquer of oligomer 3 in dimethylformamide, having a solids content of 15 percent, was used to impregnate 181E glass cloth (with an A–1100 finish). The impregnated cloth was dried in a circulating air oven at 325°F for a few minutes and then vacuum-dried at 272°F for 16 hours. A seven-ply laminate was molded at 485°F, 200 psi, 2 hours using a contact time of 150 seconds. The resulting laminate had a resin content of 44.8 percent. It was then post-cured in air using the following cycle: 4 hours at each temperature, 450°F, 500°F, 550°F, and 600°F. An excellent molded laminate resulted which had a final void content of 1.2 percent. During the post-cure the laminate lost less than 0.5 percent of its weight.

We claim:

1. A cured resin derived by the homopolymerization of acetylene substituted polyimide oligomer having the following general structure:

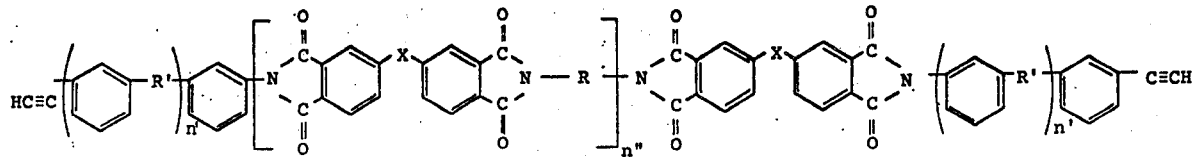

wherein R is wherein Z is O, $CH_2$, S, CO, $SO_2$—$CF_2$—$_m$, or —$CF_2$—O—$CF_2$—, and wherein $n$ is 0–5, $m$ is 0–5, and wherein R' is O, S, CO, $CH_2$, $SO_2$, —$CF_2$—$_m$, or —$CF_2$—O—$CF_2$—, and wherein X is O, S, $CH_2$, CO, $SO_2$ —$CF_2$—$_m$, or —$CF_2$—O—$CF_2$—, and wherein $n'$ is 0 to 5 and $n''$ is 0 to 5.

2. A resin of claim 1 wherein R is as defined above X is CO, $n'$ is 0, R' is O $n''$ is 1.

3. The process of producing cured resins of claim 1 comprised of heating said acetylene substituted polyimide oligomer at elevated temperatures ranging from 190°–600°C at a pressure from about 15 psi to about 200 psi.

4. The process of producing cured resin of claim 1 comprised of heating acetylene substituted polyimide oligomer at elevated temperatures in the presence of catalyst taken from the group composed of Ziegler catalyst, Friedel Craft catalyst or non Friedel Craft organo metallic catalyst.

* * * * *